United States Patent
Geissler et al.

(10) Patent No.: US 8,443,101 B1
(45) Date of Patent: May 14, 2013

(54) METHOD FOR IDENTIFYING AND BLOCKING EMBEDDED COMMUNICATIONS

(75) Inventors: William Karl Geissler, Stafford, VA (US); John Colin McEachen, Carmel, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 72 days.

(21) Appl. No.: 12/757,429

(22) Filed: Apr. 9, 2010

Related U.S. Application Data

(62) Division of application No. 11/138,699, filed on May 24, 2005, now Pat. No. 7,725,595.

(51) Int. Cl.
| | |
|---|---|
| *G06F 15/16* | (2006.01) |
| *G06F 15/173* | (2006.01) |
| *G06F 11/00* | (2006.01) |
| *G06F 9/00* | (2006.01) |
| *G06F 7/04* | (2006.01) |
| *G08C 17/00* | (2006.01) |
| *H04B 7/14* | (2006.01) |
| *H04B 1/00* | (2006.01) |
| *H04B 3/46* | (2006.01) |
| *H04L 12/66* | (2006.01) |
| *H04L 29/06* | (2006.01) |
| *H04L 9/32* | (2006.01) |

(52) U.S. Cl.
USPC ........... 709/235; 370/220; 370/236; 370/311; 370/315; 370/352; 370/384; 370/389; 370/401; 370/468; 375/150; 375/228; 709/203; 709/206; 709/224; 709/231; 709/251; 713/153; 713/176; 726/11; 726/13; 726/22; 726/24; 726/26; 726/4

(58) Field of Classification Search ....................... None
See application file for complete search history.

(56) References Cited

U.S. PATENT DOCUMENTS

| | | | |
|---|---|---|---|
| 4,972,315 A | 11/1990 | Yamasaki et al. | |
| 5,117,499 A | 5/1992 | Miyata | |
| 5,640,525 A | 6/1997 | Yumoto et al. | |
| 5,864,679 A * | 1/1999 | Kanai et al. | 709/238 |
| 5,898,713 A * | 4/1999 | Melzer et al. | 714/807 |
| 5,920,900 A | 7/1999 | Poole et al. | |
| 5,978,585 A | 11/1999 | Crelier | |
| 6,005,643 A * | 12/1999 | Morimoto et al. | 375/240.26 |
| 6,044,079 A | 3/2000 | Calvignac et al. | |
| 6,088,451 A | 7/2000 | He et al. | |
| 6,346,047 B1 | 2/2002 | Sobota et al. | |
| 6,408,335 B1 * | 6/2002 | Schwaller et al. | 709/224 |
| 6,438,160 B1 * | 8/2002 | Strodtbeck | 375/228 |
| 6,658,421 B1 | 12/2003 | Seshadri | |
| 6,751,728 B1 * | 6/2004 | Gunter et al. | 713/153 |
| 6,968,498 B1 | 11/2005 | Pal | |

(Continued)

*Primary Examiner* — Ario Etienne
*Assistant Examiner* — Ho Shiu
(74) *Attorney, Agent, or Firm* — Lisa A. Norris

(57) ABSTRACT

A method and system for steganography and steganalytic techniques are provided for effecting embedded communications in a variety of communication environments. One aspect may include an embedded transmitter for inserting embedded data into a packet and an embedded receiver for receiving the packet via, for example, a packetized communication network such as the Internet. Various aspects of the present invention provide robust communications with optimized throughput and may include various error handlers to maximize performance and ensure transfer of incorrupt data. A method for identifying and blocking embedded communications is also provided.

4 Claims, 7 Drawing Sheets

U.S. PATENT DOCUMENTS

| | | | |
|---|---|---|---|
| 7,082,107 B1* | 7/2006 | Arvelo | 370/311 |
| 7,224,820 B2 | 5/2007 | Inomata et al. | |
| 7,248,560 B1* | 7/2007 | Blankenship et al. | 370/220 |
| 7,505,997 B1 | 3/2009 | Gelf | |
| 7,519,819 B2 | 4/2009 | Bradley et al. | |
| 7,725,595 B1 | 5/2010 | Geissler et al. | |
| 7,739,334 B1* | 6/2010 | Ng et al. | 709/206 |
| 8,151,348 B1* | 4/2012 | Day | 726/22 |
| 2001/0005360 A1* | 6/2001 | Lee et al. | 370/236 |
| 2001/0039579 A1* | 11/2001 | Trcka et al. | 709/224 |
| 2001/0053178 A1* | 12/2001 | Yano et al. | 375/150 |
| 2001/0056547 A1* | 12/2001 | Dixon | 713/200 |
| 2002/0071432 A1 | 6/2002 | Soderberg et al. | |
| 2002/0080391 A1* | 6/2002 | Sugiura et al. | 358/1.15 |
| 2002/0127993 A1* | 9/2002 | Zappala | 455/404 |
| 2002/0145976 A1 | 10/2002 | Meyer et al. | |
| 2003/0056043 A1* | 3/2003 | Kostadinov | 710/104 |
| 2003/0097481 A1* | 5/2003 | Richter | 709/251 |
| 2003/0154244 A1* | 8/2003 | Zellers et al. | 709/203 |
| 2003/0154381 A1 | 8/2003 | Ouye et al. | |
| 2003/0161326 A1* | 8/2003 | Pazhyannur et al. | 370/395.52 |
| 2003/0163734 A1 | 8/2003 | Yoshimura et al. | |
| 2003/0187631 A1* | 10/2003 | Masushige et al. | 703/27 |
| 2003/0189499 A1 | 10/2003 | Stricklin et al. | |
| 2003/0208616 A1 | 11/2003 | Laing et al. | |
| 2003/0231655 A1* | 12/2003 | Kelton et al. | 370/468 |
| 2004/0001492 A1 | 1/2004 | Johnson | |
| 2004/0013112 A1* | 1/2004 | Goldberg et al. | 370/389 |
| 2004/0071218 A1* | 4/2004 | Seo | 375/240.25 |
| 2004/0100949 A1* | 5/2004 | Bennett | 370/384 |
| 2004/0128545 A1* | 7/2004 | Chakravarty | 713/201 |
| 2004/0153452 A1 | 8/2004 | Carro | |
| 2004/0172551 A1* | 9/2004 | Fielding et al. | 713/200 |
| 2004/0184066 A1* | 9/2004 | Urabe | 358/1.14 |
| 2004/0205063 A1 | 10/2004 | Coady | |
| 2004/0250127 A1* | 12/2004 | Scoredos et al. | 713/201 |
| 2005/0010630 A1 | 1/2005 | Doering et al. | |
| 2005/0022011 A1* | 1/2005 | Swander et al. | 713/201 |
| 2005/0083917 A1* | 4/2005 | Okamoto et al. | 370/352 |
| 2005/0120124 A1* | 6/2005 | Korhonen | 709/231 |
| 2005/0129045 A1 | 6/2005 | Machulsky et al. | |
| 2005/0132196 A1 | 6/2005 | Dietl | |
| 2005/0149817 A1 | 7/2005 | Biran et al. | |
| 2005/0177603 A1 | 8/2005 | Shavit | |
| 2005/0220047 A1* | 10/2005 | Baey et al. | 370/315 |
| 2005/0246634 A1* | 11/2005 | Ortwein et al. | 715/530 |
| 2005/0251572 A1* | 11/2005 | McMahan et al. | 709/224 |
| 2006/0013235 A1* | 1/2006 | Farnham | 370/401 |
| 2006/0013488 A1 | 1/2006 | Inoue | |
| 2006/0028689 A1 | 2/2006 | Perry et al. | |
| 2006/0036865 A1 | 2/2006 | Brown et al. | |
| 2006/0059551 A1* | 3/2006 | Borella | 726/13 |
| 2006/0062073 A1 | 3/2006 | Kitani et al. | |
| 2006/0104288 A1* | 5/2006 | Yim et al. | 370/395.52 |
| 2006/0268780 A1 | 11/2006 | Chou et al. | |
| 2008/0126562 A1 | 5/2008 | Ludwig et al. | |
| 2008/0263616 A1 | 10/2008 | Sallien et al. | |

\* cited by examiner

METHOD FOR IDENTIFYING AND BLOCKING EMBEDDED COMMUNICATIONS

This application is a divisional application of U.S. patent application Ser. No. 11/138,699, filed May 24, 2005, now U.S. Pat. No. 7,725,595, granted May 25, 2010, which is hereby incorporated in its entirety by reference and the benefit of which is hereby claimed.

BACKGROUND OF THE INVENTION

1. Field of the Invention

This invention relates generally to systems and methods for information communication. More particularly, the present invention relates to systems and methods for safeguarding such information and for identifying such safeguarded information within communications. Most particularly, the present invention relates to steganography and steganalysis technologies.

2. Description of Related Art

Various techniques have been provided to selectively safeguard communications. These techniques include, for example, cryptography, steganography, and covert channel communications. Cryptography typically seeks to hide the contents of a message without hiding the existence of the message itself. For example, an encrypted message may appear to a casual observer as a collection of garbled text, with no discernible meaning. Steganography, however, seeks to hide the very existence of a message from those other than its intended recipient. Typically, in a steganographic communication, a covert message is disguised within a common, readily viewable message, thus transfer of the common message is permitted without interception, since the transfer appears benign to a casual observer. A distinction might be made between steganography and covert channel communications, wherein covert channels never intended for information flow are exploited by a process to transfer information in a manner that may violate the system's security policy. As such, if any reasonably knowledgeable person observed the transfer, it would be construed as a violation of the security policy and, typically, measures would be taken to shut down the communications. For purposes of this discussion, the terms "steganography", "covert channel communications", "covert communications", and "embedded communications" may be used interchangeably to indicate the intentional concealment of information or data from a group or class of observers or recipients, the concealed information or data are transmitted, for example, during or coexistent with an overt communication process.

Modern digital communications present ample opportunity for safeguarding information via covert communications. These methods include chaffing and winnowing and the exploitation of covert channels used in the layers of the TCP/IP network model. The method of "chaffing and winnowing" provides for the transmission of digital message traffic along with an appropriate Message Authentication Code (MAC), which may be added by various mechanisms within the network model. Transmitted along with the desired message and its correct MAC are a large number of other messages, each with an incorrect MAC, preventing eavesdroppers from ascertaining which message is the correct one. This technique, however, merely obscures the content being transmitted, and fails to address the key tenet of steganography; i.e., the fact that some sort of covert communications is occurring. Thus, if the desired message were translated from its binary or hexadecimal values into actual text, an observer would readily note the occurrence of some sort of covert communications. Deletion of the message by the observer would serve to foil the scheme, whether or not the observer was able to ascertain the actual contents of the message.

Covert channels of communications in the network layers of a communication system such as a wide-area network (WAN) or a local area network (LAN) may also be utilized. Various layers such as the physical, the link, the network, the transport, the application, or various combinations of the preceding, may be used. For example, the physical layer of the TCP/IP network is used to interface the higher layers of the network model with the physical medium that transfers the information from computer to computer. This layer contains the hardware necessary to effect transmission and handles the timing and control of the signals that are passed between computers.

One technique used at the physical layer uses control signals in a point-to-point connection to transmit hidden information. In normal operations of a serial link or dial-up circuit, data flow can be controlled by the use of the Clear To Send/Ready To Send (CTS/RTS) signal pair. If the CTS/RTS signals can be manipulated with minimal disruption to the actual data flow, then a second communications channel can be opened, using the CTS/RTS signal as the data waveform. In the first scenario, the CTS/RTS signal provides for uninterrupted data flow between the two linked systems. In the second scenario, although it appears to an observer that the data flow is controlled by a standard handshake routine, the CTS/RTS signal is actually a covert channel, transmitting a predetermined code; for example, standard Morse code. This technique is only applicable to serial link communications, however, and does not readily lend itself to TCP/IP network communications.

Another technique at the physical layer involves manipulation of the collision control functions of Ethernet networks. In an Ethernet network, a jamming signal is transmitted over the network whenever a collision occurs between two segments of data. Both of the sending parties stop transmitting for a random period of time. This functionality can be utilized in conjunction with a covert channel according to the following: a transmitter of hidden information deliberately jams another party on the network, signaling that a bit of hidden information is next to be transmitted. Rather than waiting the random period of time before retransmission, however, the next data packet is either sent immediately (to signal a zero) or after the maximum delay, thus after the other party retransmits (to signal a one). Unlike the previously described CTS/RTS technique, the collision manipulation technique takes place over a shared network, thus the recipient of the hidden information is not limited to a specific computer system. The actual data in the transmitted packets are real, overt data to any other host on the network. The collision timing signals the hidden information. Additionally, the other party used in the signaling scheme does not share in the hidden information, but functions as a pawn in the scheme. This method, however, transmits very little information at a time, thus inhibiting effective covert communications.

At the data link layer, or link layer, steganography, or data hiding, begins to have an impact on covert communications. The link layer primarily shapes the higher-layer packets into a format for easy transmission over the physical layer and minimizes data corruption during send/receive operations to/from the physical layer. At this layer, and at all layers above this layer, there are opportunities to insert hidden information directly into the data stream without adversely affecting the overtly transmitted data. One technique involves padding Ethernet frames to meet a minimum length. Ethernet frames must contain at least 46 bytes of user data to be transmitted correctly. If the data are shorter than 46 bytes, pad bytes are inserted to meet that minimum. Hidden data could be inserted where the pad bytes are normally inserted by the transmitter and subsequently stripped off for the receiver to read. The amount that can be transmitted is dependent on the amount of valid information within the packet provided by higher layers, thus throughput may be significantly limited by transmissions of relatively small amounts of covert data.

The network layer proves the delivery mechanism for packets arriving from the link and transport layers. It appends source and destination information onto the higher layer data to ensure correct delivery and receipt of the packets. It is within this appended information that data hiding can occur. A number of techniques might be used to hide data at this layer, including insertion of the hidden information directly into the unused or reserved spaces within the IP header. Unused space within the IP header currently consists of two bits within the IP Type of Service (TOS) field. Although the considerable number of IP packets transiting a network would provide ample opportunity for covert communications, the throughput is rather limited.

Another technique at the network layer involves use of the IP header space for hidden information transfer. Rather than limiting use of space to just two bits, as seen with use of the TOS field, the identification field within the IP header might be modified to contain valid, covert information. An example of this is insertion of an ASCII character, multiplied by 256, into the identification field. The intended recipient of the covert information would need only to read the identification field and divide by 256 to ascertain the hidden message. As this file is used when fragmenting packets, however, prudent use dictates that each IP packet remains small enough to avoid fragmentation, thus limiting covert communications to some extent.

The transport layer provides data delivery to different applications within a host, and provides error control of the data that are transmitted and received. One steganographic technique at this layer relates to the concealment of information within the TCP header. The TCP header reserves six bits between the four-bit header length field and the TCP header flags, which may be used to hide data. Also, the 32-bit sequence number field used to transfer data may be used to transfer covert information. This method takes advantage of use of the sequence number field to identify an Initial Sequence Number (ISN) during the establishment of TCP connections. Rather than setting the ISN to a host-generated or arbitrary number, the ISN can be modified to denote special information (in numeric form). Since the ISN is 32 bits long, a significant amount of information can be transferred. This particular use of the sequence number field, however, is limited to connection establishments (SYN segments). While several SYN segments may be sent, rapid succession of these segments would undoubtedly attract notice, which is a violation of the notion of steganography.

The application layer facilitates interaction between the user and the host computer/network. This layer typically handles the details of individual applications and passes necessary information to the transport layer for further network action. Since the transport layer does not differentiate between types of data received from the application layer, a great amount of covert communication takes place here, primarily in the form of cryptography and steganography. In the area of networking, applications such as Hypertext Transfer Protocol (HTTP) can be exploited to carry a variety of different types of files with hidden information. For example, means of transferring hidden data may be accomplished via word processing files, where one space between adjacent words signals a zero, and two spaces signals a one, the series of ones and zeroes forming a covert message.

Another available technique in web data hiding is the insertion of various formatting tags in or around the cover media. Image and audio files may also be used. Image and audio files are inherently noisy, thus there is a significant amount of information mixed in with the data that has no significant impact on the transmission or interpretation of the cover media. For example, this can be clearly observed in most raster or bit-mapped images that are compressed under the Joint Photographic Experts Group (JPEG) image compression standard. In many cases, this noise is simply standard Gaussian white noise that is prevalent in all but images of the highest resolution. This noise can be easily replaced with embedded information, with the resulting image generally appearing to casual observers as an identical image to the cover image.

Audio files also have significant capacity for hidden information. The typical human capacity for hearing is in the range of 4 kHz to 20,000 kHz. In the interest of space conservation, most audio clips are sampled at a rate that allows clear transmission of the intended signal (the audio) without using the entire bandwidth. As a cover medium, the audio files can hide large amounts of information, depending on the relative amplitude and temporal characteristics of the cover media and the information to be embedded. If the information to be embedded can be quantified and sampled at a significantly higher rate than the cover media, the hidden messages (stego-messages) can conceivably carry huge amounts of data. With pure tones, for example, a steganography user should be able to manipulate one sample in 8000. With classical music, one sample in 1800 may be sufficient to hide information without degrading the cover signal.

Video files also present an opportunity to embed significant amount of information into a cover medium. In the case of video, the steganography user has the option of using the visual cover media, the audio cover media, or both to transfer the hidden information. Depending on the level of compression of the audio and video, the capacity for inclusion of hidden information in video files is increased significantly. If the compression is low, the amount of space available to embed information is greater.

Though the amount of data at the application layer is limited only by the amount of "real" data available in which to hide the cover data, a significant increase in the file size would most certainly alert an observer to the possibility of hidden data with the files. Similarly, while a graphics file can accommodate approximately half of its size in hidden information, modern graphics embedded in web pages are compressed to a great extent to expedite the download of files.

Further, the aforementioned schemes fail to provide for data robustness. For example, in the data link layer and network layer protocols, the information is sent without any requirement for retransmission if the data is invalid. Therefore, errors in the covert data within these layers would render the information useless. To prevent such an occurrence, error-correcting codes are typically used. Depending on the code used, however, this presents a significant increase in the amount of covert data to be transmitted, with a resulting decrease in overall covert data throughput.

Overt data transmission at the transport layer is considered reliable due to various error-correcting mechanisms within the protocol, including use of sequence numbers and a checksum that covers the data as well as the TCP header. Additionally, the application layer may contain error correction mechanisms that will force a retransmission of the data if it is corrupt. None of the previously described systems and methods defines means for handling errors within the covert data and methods for retransmissions of covert data.

What is needed, then, is a robust system and method for provision of embedded communications via various networks, including wide area networks (WANs) such as the Internet. It is further desirable to provide such a system and method whereby the embedded communications embody optimal performance characteristics, including throughput, error detection and correction, and maintenance of quality of the associated real data and the embedded data. It is also desirable to provide such a system and method that can avoid detection of the embedded data or information by casual observers of related processes and by unintended parties to the communication. Finally, it may be desirable to provide a counter method and system for detecting and blocking the unwanted covert communications of others.

SUMMARY OF THE INVENTION

One aspect of the invention may include an embedded transmitter capable of inserting embedded data into at least one field in a packet and inserting a first embedded checksum value into at least one field in the packet; and an embedded receiver capable of receiving the packet; comparing a second embedded checksum value to the first embedded checksum value in the packet.

Another aspect of the invention may include steps of receiving a packet having embedded data in at least one field and a first embedded checksum value; calculating a second embedded checksum value for the embedded data; performing a checksum comparison between the first embedded checksum value and the second embedded checksum value; and if the checksum comparison is equal, routing the embedded data to a predetermined embedded data handler.

Yet another aspect of the invention may include steps of replacing overt data of a data field of a packet with embedded data; calculating a first embedded checksum value of the embedded data; replacing a first overt checksum value with the first embedded checksum value; transmitting the packet via the communication network; receiving the packet; calculating a second embedded checksum value for the embedded data; performing a checksum comparison between the first embedded checksum value and the second embedded checksum value; and if the checksum comparison is equal, routing the embedded data to a predetermined embedded data handler.

A further aspect of the invention may include steps of replacing overt data of a data field of a packet with embedded data; calculating a first embedded checksum value of the embedded data; comparing the first embedded checksum value to a first overt checksum value; if the comparison is equal, replacing the first overt checksum with a flag value; else replacing a first overt checksum value with the first embedded checksum value; transmitting the packet via the communication network; receiving the packet; calculating a second embedded checksum value for the embedded data; if the checksum comparison is equal or a flag value is detected: processing the embedded data or forwarding the embedded data to a predetermined embedded data handler; and generating an embedded acknowledgment for the packet, the embedded acknowledgment having an acknowledgment number associated with the packet; else if the checksum comparison is unequal: discarding the current received packet; and repeatedly regenerating an embedded acknowledgment for the last packet successfully received in proper sequence order until a predetermined event occurs, then retransmitting the next-in-sequence packet.

A still further aspect of the invention may include steps of establishing a baseline error rate measurement in a predetermined route in the communication network; monitoring traffic on the predetermined route in the communication network to detect transmission errors; establishing a current error rate measurement based on the detected errors; and comparing the current error rate measurement with the baseline error rate measurement to determine a likelihood of embedded communication.

DETAILED DESCRIPTION

Figure 1:
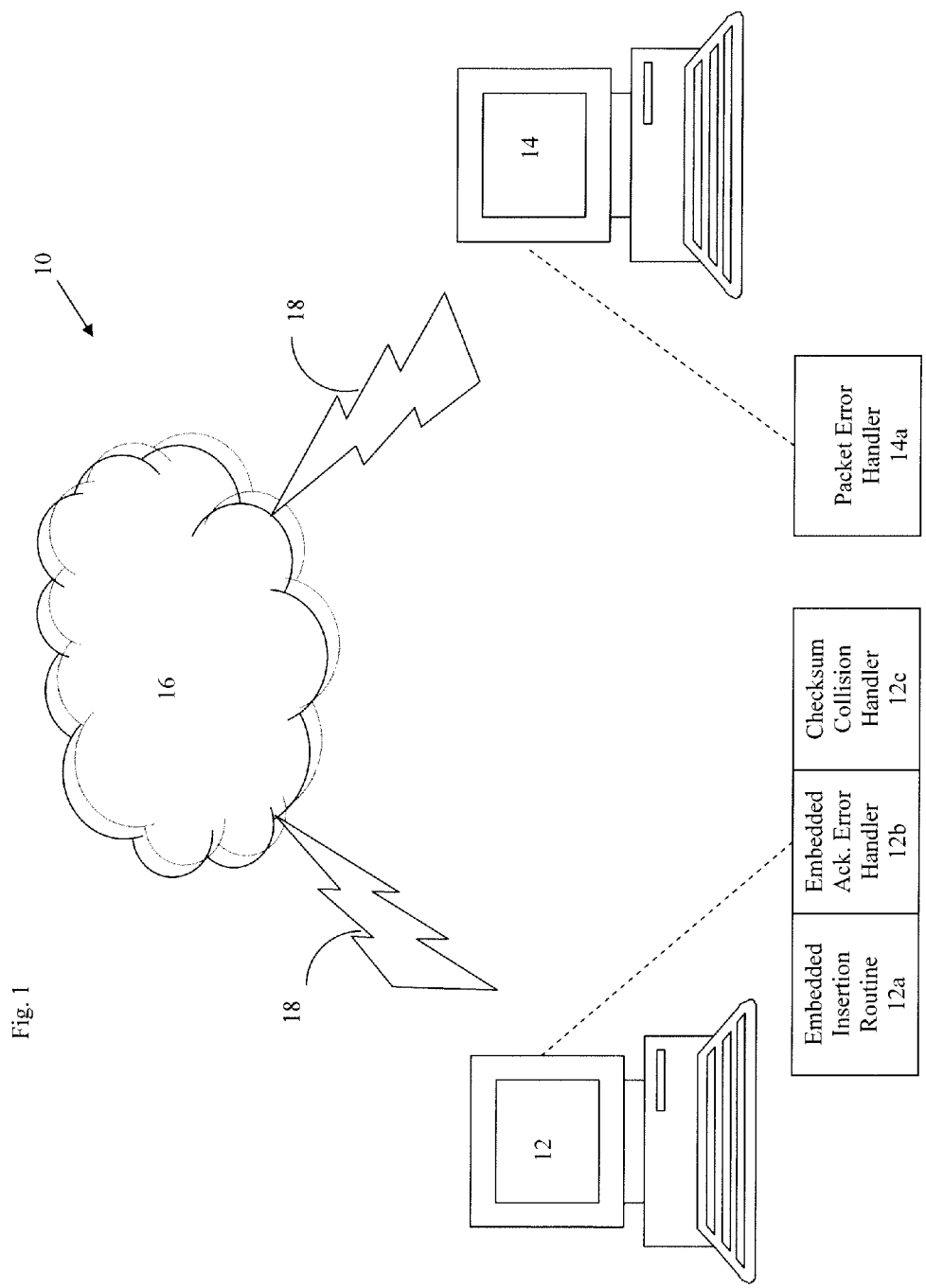
FIG. 1 illustrates an embedded communication system according to an embodiment of the present invention.

An embedded communications method and system according to the present invention provide a robust solution for provision of embedded communications via various networks, including wide area networks (WANs) such as the Internet. Various embodiments of the present invention provide quality embedded communication of information and data, including error detection and correction capabilities as well as detection avoidance. Various embodiments also provide a communication model for detection and identification of embedded communications in a network. It is contemplated that the present invention may be embodied and/or associated with, inter alia, as software, hardware, computers, networking components, networks, communication links, protocols, and a combination thereof, or in other manners or combinations of components capable of carrying out the functionality described herein. For example, a computer may perform the method by reading instructions from a computer readable medium.

Particularly, the present invention may be provided as a software solution in various communication environments having, for example, various end-to-end network protocols and technologies with error handling capabilities, such as the Transport Control Protocol (TCP) or Asynchronous Transfer Mode (ASM) Adaptation Layers. For example, software of various aspects of the present invention may include the functionality necessary to embed predetermined data or information to be covertly transmitted (covert data) into various fields of a packet or segment, such as a TCP packet, for traversal of a wired or wireless communication network such a central server network such as a local area network (LAN), a virtual private network (VPN) wide area network (WAN), or the Internet. Traversal includes any link or combination of communication links between any point or points within a network or between such networks. Various embodiments of the present invention may also be utilized to detect and identify embedded communications such as those found embedded in one or more packets in a packetized network.

In various aspects of the present invention, embedded data (information or data intended to be communicated in a covert manner or communicated such that predetermined recipients are aware of its presence and able to ascertain its value, despite that fact that in various forms, the embedded data may not be visible or ascertainable to a casual observer) may be transmitted in significant blocks of information; for example, 1460 bytes of data, resulting in high throughput. In contrast, systems of the prior art often limited such incorporation of embedded data to a range of two to four bytes. Further, various aspects of the present invention may utilize the TCP header fields in the transport layer of a communication network as the vehicle for embedded data transfer, thus avoiding the filtering mechanisms of the network layer and the application layer, as well as avoiding increases in the file sizes with inclusion of embedded data, a characteristic which invited detection in the prior art systems and methods. Finally, in contrast to the prior art, various aspects of the present invention may provide robustness via error detection and correction methods for the embedded data and its transmission. Certain aspects of the present invention may provide embedded communication detection and blocking capabilities, including embedded communications utilizing TCP header fields such as the checksum field and the data field, as opposed to inventions of the prior art, which lack the aforementioned functionality.

With reference now to the drawings, wherein like items are designated with the same reference numerals, there is shown generally in FIG. 1 at 10 a system of embedded communications having an embedded transmitter 12 for transmitting embedded data and an embedded receiver 14 for receiving the embedded data. In various aspects of the present invention, the embedded transmitter 12 may be integrally or independently associated with functional routines and/or error handlers such as an embedded insert routine 12a; an embedded acknowledgment error handler 12b; and the checksum collision handler 12c. Similarly, in various aspects of the present invention the embedded receiver 14 may be integrally or independently associated with functional routines and error handlers, such as a packet error handler 14a. The error handlers are discussed in detail hereinafter.

Various aspects of the embedded communications systems 10 may comprise computer hardware and/or software systems, operating system kernels, networking protocol, logic, modules, and components, as well as, or other structural or operational components, so long as the functionality described herein is carried out. By way of example, the embedded transmitter 12 may comprise a computer server having multiple software modules, the computer server located in a physical or logical sense as an intermediate node on the Internet. The embedded receiver 14 may comprise a computer server having multiple software modules, the computer server located in a physical or logical sense as an intermediate node or as a TCP client on the Internet.

The system for embedded communications 10 may be associated with a communication network 16, such as the Internet, the communication network 16 having at least one link 18 for traversal of data or information between various points internal or external to the communication network 16. The communication network 16 may comprise, for example, a packetized or packet-switched network such as the Internet, and the at least one link 18 may comprise, for example, short wave radio channels, cellular, satellite, fiber optic cables, copper cables, software logic, routers, networking and other such media and combined media as needed to communicate data or information from a source to a destination. The communication network 16 may further utilize various protocol, such as the Transmission Control Protocol, or TCP, as is known in the art.

Various aspect of the present invention may utilize a communication network 16 such as the Internet, having packets and governed by the TCP protocol. Typically, in such a network the TCP packet may be used as the main transport mechanism for overt data. In particular, the present invention may utilize the TCP packet for its embedded communications. By way of illustration, an aspect of the invention may be utilized in, or utilize, a communication network 16 such as packet-switched network. When a file is sent from one point to another on the Internet, the (TCP) layer of the Transmission Control Protocol/Internet Protocol (TCP/IP) divides the file into "chunks" (packets) of an efficient size for routing. Each of these packets is separately numbered with a sequence number in a sequence number field. The individual packets for a given file may travel different routes through the Internet. When they have all arrived at destination, they are reassembled into the original file order by the TCP layer at the receiving end.

Figure 2:
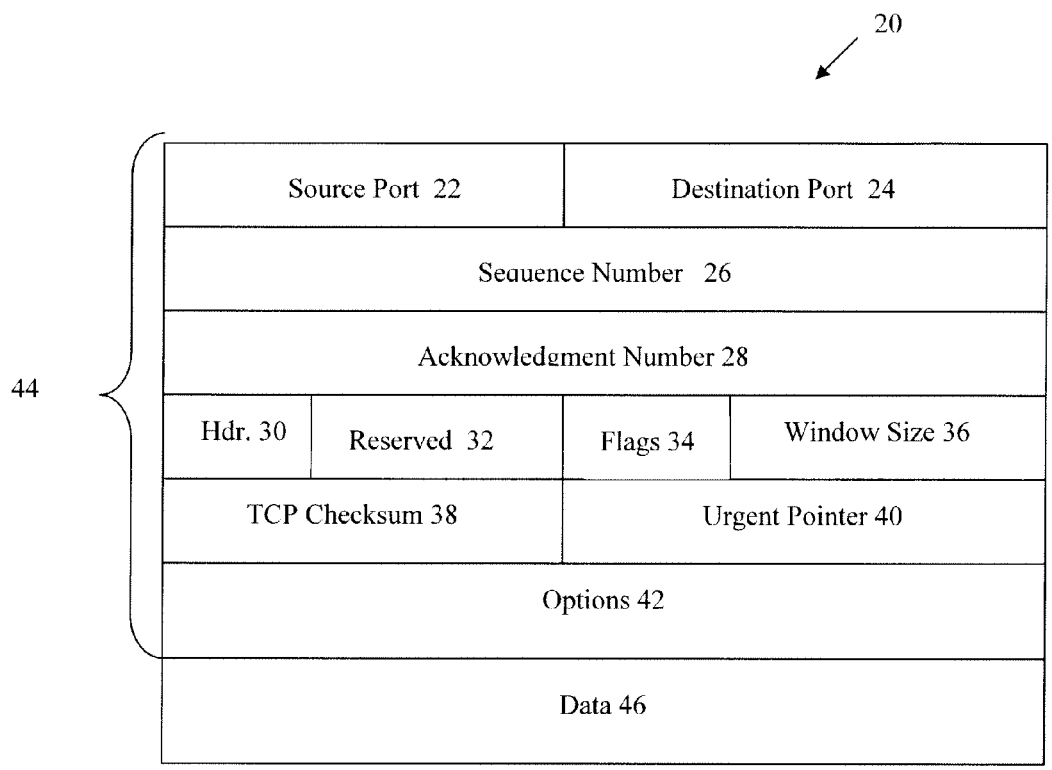
FIG. 2 illustrates a TCP packet according to the prior art.

With reference now to FIG. 2, there is shown a TCP packet 20 according to the prior art, exemplified with various fields which are the same or similar to those found in TCP packets. For example, the fields may include a source port field 22, a destination port field 24, a sequence number field 26, an acknowledgment number field 28, a header length field 30, a reserved field 32, a flags field 34, a window size field 36, a TCP checksum field 38, an urgent pointer field 40, an options field 42, (the aforementioned fields may be referred to individually or collectively as "the header fields 44"), and a data field 46, which may contain, for example, data or information on the order of 512 to 1460 bytes, as found, for example, in an Ethernet environment.

Traditional error handling methods in a TCP environment may be performed through the use of, for example, sequence numbers and integrity checks. The sequence number in the sequence number field 26 of the packet 20 may be used to ensure that all packets are reassembled into the correct sequence. An integrity check may be performed to check if the data has been inadvertently or maliciously changed during transmission or storage. Checksums, for example, are often employed to test integrity. A checksum typically comprises a mathematical value that is assigned to a file, packet, or field of data upon its creation or prior to its transmission. The checksum is created by performing a complicated series of mathematical operations that translate the data in the file into a fixed string of digits called a hash value, which is then used as the specific checksum value assigned to the data. Without knowing which cryptographic algorithm was used to create the hash value, it is highly unlikely that an unauthorized person would be able to change data without inadvertently changing the corresponding checksum. Therefore, the checksum value may, for example, be transmitted with the data to a destination point, where a second checksum is calculated and compared to the original checksum. If the two checksum values match, it is assumed that the associated data arrived intact.

A first overt checksum value, which may typically comprise a 16-bit one's complement sum of certain fields of a transmission unit, may be included in the TCP checksum field 38 of the packet 20, so the receiver can check to see whether the information contained in the packet 20 arrived safely. If the checksums match, it may be assumed that the complete transmission was received successfully. The receiver of the packet 20 may generate an acknowledgment of successful receipt to the transmitter. The transmitter and receiver may utilize various systems to ensure retransmission of lost packets, packets having corrupted data, or lost acknowledgments, as is well known in the art and discussed hereinafter.

With reference again to FIGS. 1 and 2, various aspects of the present invention may utilize various TCP processes and components, such as TCP error handlers, to effect embedded communications. For example, in certain aspects of the present invention, the embedded transmitter 12, the embedded insertion routine 12a, or a combination thereof, may be used to provide embedded data (not shown) or to insert embedded data (not shown) into a preexisting mechanism, such as a packet 20. The embedded data, for example, may replace the existing data, or overt data (not shown), in the data field 46 of the packet 20. The embedded data may, for example, be the exact number of bytes of the overt data being replaced. The embedded transmitter 12 may then calculate a first embedded checksum (not shown) for the embedded data and replace a first overt checksum value typically found in the TCP checksum field 38 of the packet 20 with the first embedded checksum value. Upon addition of the first embedded checksum value to the packet 20, the embedded transmitter 12 or other means may then forward the packet 20 via at least one communication link 18 in the communication network 16 to the embedded receiver 14. Upon receipt of the packet 20 having the embedded data and the first embedded checksum value, the embedded receiver 14 may calculate a second embedded checksum value for the embedded data in the data field 46 and compare the second embedded checksum value to the first embedded checksum value of the TCP checksum field 38. If the comparison is equal, then the embedded receiver 14 may forward the packet 20 to an embedded data handler (not shown). The embedded data handler may be integral to the embedded receiver 14, independent thereof, or partially integrated with the embedded receiver 14. For example, the embedded receiver 14 may comprise a software module residing on a computer server. The embedded receiver 14 may comprise yet another software module residing on the same server.

Various aspects of the present invention may include one or more error handling routines, for example, the embedded acknowledgment error handler 12b, the checksum collision handler 12c, and the packet error handler 14a. Such routines may be integral to one or more components, for example, the packet error handler 14a may be embodied as a software module integral with the embedded receiver 14, may reside independently of system components, or embody combinations thereof.

By way of illustration, error handling routines of the present invention may "piggyback" on traditional error handling techniques employed in TCP communication environment. In such TCP communications, various errors may occur such as packets lost in transmission, packets received with corrupt data, or acknowledgments lost in transmission. To cure problems associated with lost packets, TCP error handlers may use a method the same or similar to the following: the receiver transmits an acknowledgment to the transmitter, referencing the current packet (most recently received packet in proper sequence order). If a packet is lost in transmission, however, the receiver has no way of knowing of its existence and, therefore, cannot send an acknowledgment. In such a situation, the receiver continues to receive in packets and check the sequence number. In the case of a packet received out of order, such as the successor of a lost packet (the packet transmitted immediately after the packet lost in transmission), the receiver checks the sequence number of the successor packet, notes that it is not in sequence, and generates an acknowledgment referencing the last packet received in proper order sequence.

In the case of an out-of-order packet, it is assumed that the misordered packet will arrive as one of the next two to three arriving packets, thus allowing the send-receive-acknowledge pattern to flow in an uninterrupted manner. In the case of a lost packet, however, the receiver will continue to transmit acknowledgments referencing the last packet received in proper sequence order until the occurrence of a predetermined event, for example, after receipt by the transmitter of three consecutive acknowledgments for the same packet. Upon such a predetermined event, the transmitter retransmits the next packet in sequence order to the receiver; i.e., the packet in sequence order following the packet referenced in the three acknowledgments. In this manner, the TCP protocol handlers ensure receipt of all sequenced packets.

Similarly, for packets arriving in the proper sequence order but containing corrupt data (as evidenced by a mismatch between a first overt checksum value in the packet and a second overt checksum value calculated by the receiver on receipt), the receiver may simply discard the packet, foregoing transmission of an acknowledgment for the current packet having corrupt data and generating an acknowledgment for the last packet received in proper sequence order (and not discarded). Upon receipt of successor packets to the discarded packet, the receiver will continue to generate redundant acknowledgments for the last packet received in proper sequence order (and not discarded) for each thereafter-received packet until occurrence of a predetermined event, such as receipt by the transmitter of three successive redundant acknowledgments, thus triggering retransmission of a copy of the discarded packet.

Figure 3:
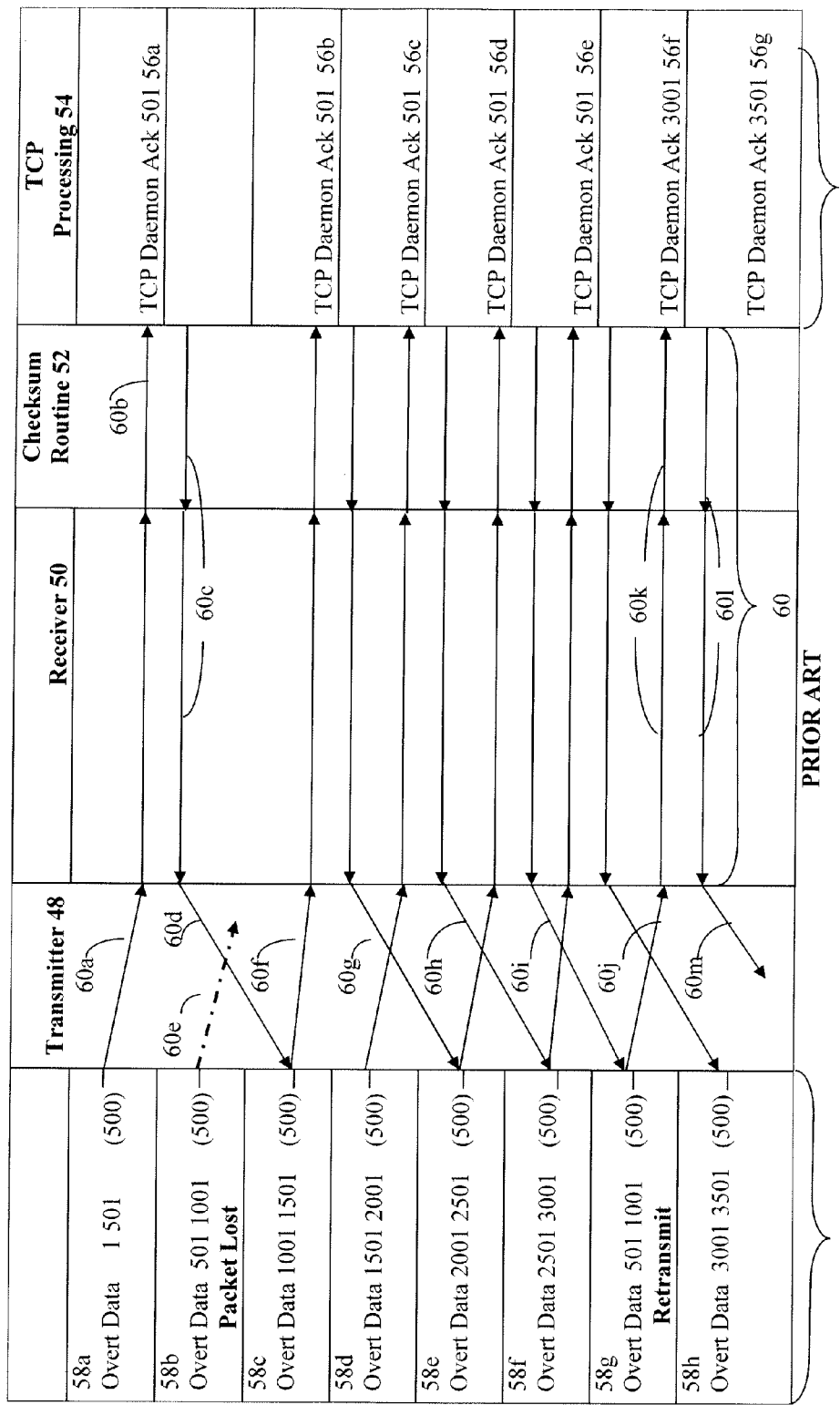
FIG. 3 illustrates a flow control diagram for TOP packets, according to the prior art.

With reference now to FIG. 3, which generally shows a flow control process of the prior art for TCP communications in a communication network, the packet error handler may be illustrated as follows: in a communication network (not shown) utilizing the TCP Protocol, packets of information are forwarded between a transmitter 48 and a receiver 50, which can provide or are associated with, various services including a checksum routine 52 and TCP processing 54. TCP protocol handlers, such as TCP daemon process (es) 56, may provide error handling that may be utilized to embed, signal, or otherwise facilitate overt data transmissions and processing functionalities. For example, the TCP daemon 56 may generate overt acknowledgments 56a-56g upon receipt of certain packets, as hereinafter described.

Error handling in overt TCP communications may be typically implemented, for example, by utilizing the sequence number of the sequence number field 26 in the packets 20 (shown collectively as 58 in FIG. 3). For example, packets 58a-58h and acknowledgments 56a-56g are transmitted to and from the transmitter 48 and the receiver 50 in a communications network. Each packet includes a sequence number in the sequence number field 26. Application of the sequence number ensures proper reassembly of the packets into a file by the receiver 50 or the TCP daemon processes 54 running, for example, on the receiving node (such as the receiver 50) of the communication network 16. In such an example, packets 58a-h, having 500 bytes of data in the data field 46 are numbered according to each packet's respective order in the entire file. For example, the packet 58a containing the first 500 bytes of data receives a sequence number 501 reflecting the bytes 1: 501 of data; the packet 58b containing the second 500 bytes of data receives a sequence number 1001 reflecting the bytes 501: 1001, and so forth.

Upon transmittal (shown at 60a) of packet 58a, the TCP daemon process 56 receives packet 58a; calculates a second overt checksum value for the packet and compares its first overt checksum value in the TCP checksum field 38, as shown at 60b, against the second overt checksum value. If the comparison is equal, then the TCP daemon 56 generates an acknowledgment associated with a packet having overt data (overt acknowledgment), shown here as overt acknowledgment 56a, and transmits the overt acknowledgment 56a to the transmitting source, as shown at 60c and 60d, for receipt and processing by the transmitter 48.

On occasion, packets in a communications network are subject to loss and/or corruption. In this example, packet 58b is lost in transmission, as shown at 60e. The transmitter 48 continues to transmit the packets 58c-58f in sequence order; i.e., the packet 58c is forwarded at 60f to the receiver 50 for TCP processing 54 including checksum routines 52 by the TCP daemon 56. Upon receipt of the packet 58c, the TCP daemon 56 checks the sequence number and compares it against the expected sequence number; i.e., the sequence number 1001 of the missing packet 58b. Noting the mismatch, the TCP daemon process 56 continues to generate acknowledgments 56b-56e for the last packet received in proper sequence order (in this case, packet 58a), as it is generally expected that the misordered packet will arrive within two to three subsequent transmissions. After some predetermined event—for example, receipt by the transmitter 48 of three repeated acknowledgements 501 56b, 56c, and 56d, for the packet having the sequence number 501, as shown at 60g-60i, the transmitter 48 resends a copy 58g of the lost packet 58b, as shown at 60j. Upon proper receipt of the packet 58g by the receiver 50, as shown at 60k, the TCP daemon checks the sequence number 1001 of the retransmitted packet 58g, finds it to match the expected sequence number, and generates an acknowledgment 3001 56f for the most recently received packet in proper sequence order (in this case, an overt acknowledgment 56f for packet 58f having the sequence 3001 is sent, as shown at 60l, 60m). By this method, for example, packet errors such as lost packets may be regenerated and transmitted for proper receipt and resequencing of all packets within a given file. Corrupted packets discarded by the receiver 50 may be handled via similar means; for example, acknowledgments are not sent for discarded packets, thus the receiver 50 or the TCP daemon 56 continues to generate redundant acknowledgments for the last packet received in proper sequence order until a predetermined event occurs (such as consecutive receipt of three acknowledgments having the same sequence number), after which time the transmitter 48 regenerates and transmits a copy of the discarded packet.

Figure 4:
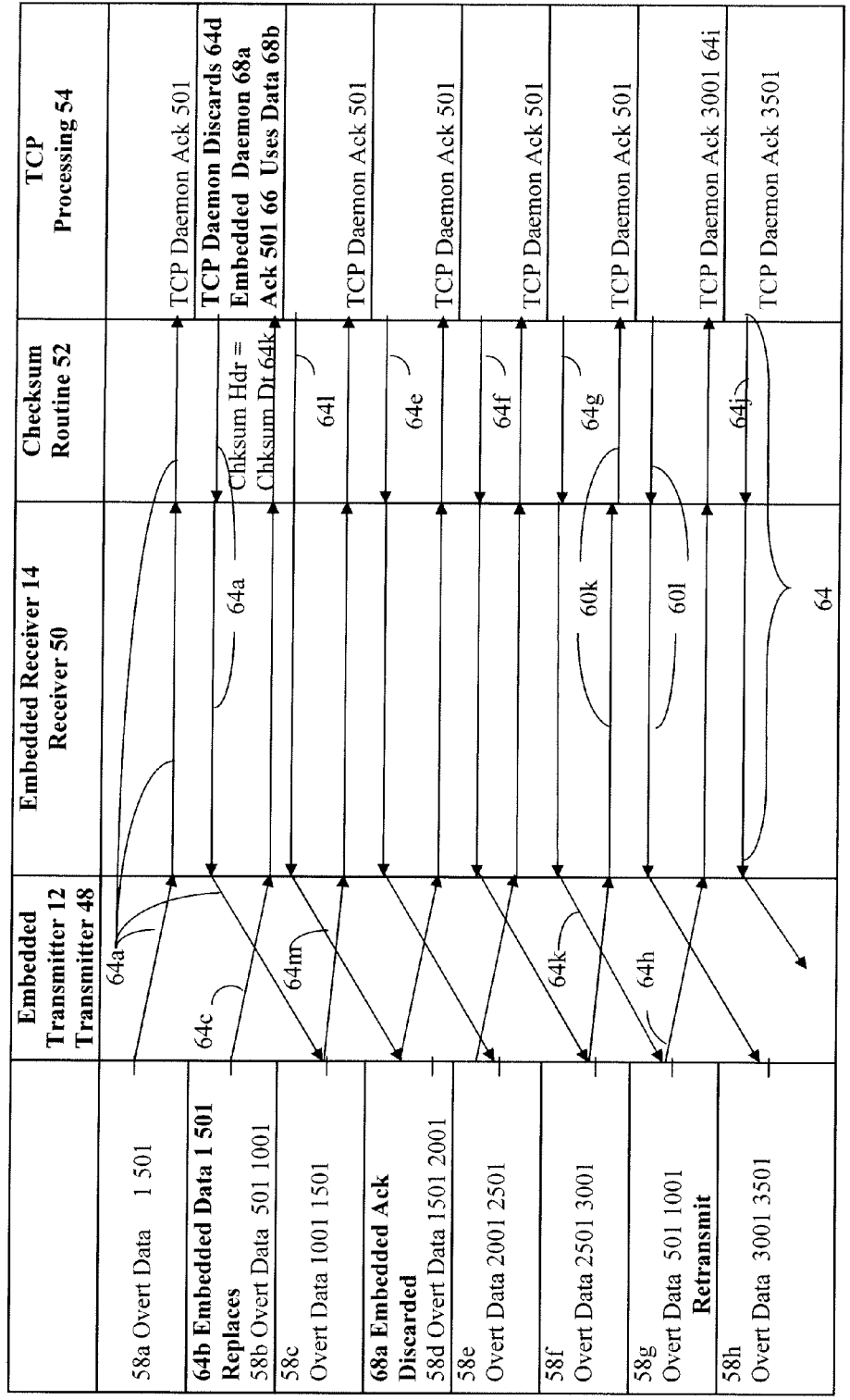
FIG. 4 illustrates a flow control diagram for embedded communications, according to an embodiment of the present invention.

Various aspects of the present invention may "piggyback" on the normal error handling routine of TCP communications to effect transmission/data error control and resolution for embedded communications. For example, and with reference to FIG. 4 and continuing reference to FIGS. 1-3, there is shown generally at 62 a flow control process associated with various aspects of the present invention utilizing the packet error handler 14a. An example of utilization of the packet error handler 14a is illustrated as follows. Here, the transmitter 48 is generating packets 58a-58h having overt data in the data field 46 (as shown in FIG. 2). The packet 58a having overt data is transmitted to the receiver 50, a checksum test validates it for acceptance; and an acknowledgment referencing packet 58a (501) is transmitted back to the transmitting source (shown here at 64a), as heretofore described.

With respect to packet 58b having sequence number 1001, however, the embedded transmitter 12 replaces the overt data (not shown) in the data field 46 with embedded data (not shown), as shown at 64b; calculates a first embedded checksum value with respect to the embedded data; replaces the first overt checksum in the TCP checksum field 38 with the first embedded checksum value (not shown); and forwards the packet 64b now having embedded data to the receiver 50 and the embedded receiver 14, as shown at 64c. The receiver 50 and/or the TCP daemon process 54 calculate a second overt checksum value for the packet 58b now having embedded data in place of the original, overt data or selected fields, then compares the second overt checksum value to the first embedded checksum value embedded in the packet. The comparison should yield an inequality in values, resulting in discard of the packet 58b, as shown at 64d. Under the typical error handling process above, redundant acknowledgments referencing packet 58a (the last successfully received packet in proper sequence order) will be sent from the TCP daemon process to the transmitter 48, shown at 64e, 64f, and 64g, respectively, for packets 58c-58e, until a precipitating event forces retransmission of the packet 58b, shown at 64h, this time carrying its original payload of overt data. An overt acknowledgment 64i is generated and forwarded to the transmitter 48, as shown at 64j, for the last successfully (incorrupt) received packet in proper sequence order.

Meanwhile, upon receipt of the packet 58b having the embedded data by the embedded receiver 14, the embedded receiver 14 may calculate a second embedded checksum value for the packet 56b and compare it to the first embedded checksum value, shown at 64k. If the comparison proves equal, the embedded receiver 14 may then generate an embedded acknowledgment 66 for the successfully received packet 58b having embedded data. The embedded acknowledgment 66 may include a third embedded checksum value calculated by the embedded receiver 14 for preselected fields of the embedded acknowledgment 66, wherein, for example, the preselected fields are not typically used in normal (non-embedded) operations for calculation of a checksum value. The third embedded checksum value may be inserted into the embedded acknowledgment 66 for transmission to the embedded transmitter 12 and the transmitter 48, as shown at 64l.

Upon receipt of the embedded acknowledgment 66 by the transmitter 48, shown at 64m, a checksum calculation and comparison process may be performed on the embedded acknowledgment 66 by the transmitter 48. A mismatch should result from the comparison, resulting in a discard of the embedded acknowledgment 66 by the transmitter 48, as shown at 68a. In this example, the entire transmission processes of a packet having embedded data as well as an embedded acknowledgment between an embedded transmitter and an embedded receiver may be carried without detection or identification of the embedded data by unintended parties or devices; such as the receiver or transmitter during normal TCP communication.

Continuing with the foregoing example, the embedded receiver 14 may process the embedded data or forward the packet to a data handler for further processing, storage, or other functions, as shown at 68b. If a comparison is performed between, for example, the first embedded checksum and a calculated second embedded checksum, and the comparison proves unequal (which may indicate overt data or corrupt embedded data), the embedded receiver 14 may forego further processing and discard the packet 58b.

The packet error handler 14a may be invoked at various times during embedded operations. For example, after the embedded receiver 14 performs the comparison of embedded checksum values, supra, the packet handler may compare the sequence number (here, 1001) of packet 58b with the expected sequence number; i.e., the ordinal sequence number immediately following the sequence number of the most recently generated embedded acknowledgment. The embedded receiver 14 then generates an embedded acknowledgment 66 having the sequence number for the most recently received (incorrupt) packet in proper sequence order and transmits the embedded acknowledgment to the transmitter 48 and the embedded transmitter 12. Various aspects of the present invention may utilize various predetermined events to trigger follow-on actions. For example, upon consecutive receipt of three embedded acknowledgments having the same sequence number by the embedded transmitter 12, the embedded transmitter may retransmit a packet having the embedded data originally inserted into the packet 58b. By this means, lost or discarded (such as corrupt) packets having embedded data are tracked and reconciled.

With reference to the embedded acknowledgment error handler 12b, various aspects of the present invention may be employed to cure deficiencies in acknowledgment transmissions. For example, the embedded acknowledgment handler 12b may function according to general TCP principles, wherein the embedded transmitter 12 or other component may, for example, set or reset a timer (not shown) after each packet 20 having embedded data is transmitted. If the embedded transmitter 12 has no more information to send, then it waits for an acknowledgment. If the embedded receiver 14 receives no acknowledgment and the timer expires, then the embedded receiver may, for example, retransmit the unacknowledged packet 20 having the embedded data 74.

Various aspects of the current invention may predicate acceptance of an embedded acknowledgment on, for example, a successful (or equal) comparison between the sequence number in the received embedded acknowledgment and the sequence number for the next expected embedded acknowledgment in sequence order. Similarly, the acceptance may turn on a successful (equal) comparison between, for example, a third embedded checksum value inserted into the header of the embedded acknowledgment and a fourth embedded checksum value calculated upon receipt of the embedded acknowledgment by the embedded receiver 14. An unequal comparison may result in a refusal to accept the embedded acknowledgment, or a de facto discard of the embedded acknowledgment, whereafter, for example, the packet associated with the discarded embedded acknowledgment may be retransmitted with its embedded data payload upon a predetermined event, such as expiration of a timer. A skilled artisan will note that various aspects of the current invention may predicate acceptance or rejection of embedded acknowledgments on various other tests, conditions, events, or the like.

Checksum collisions may be identified and eradicated with, for example, the checksum collision handler 12c. In instances where the first overt checksum value equals the first embedded checksum value, resulting in a "checksum collision", both the TCP daemon process 54 and the embedded receiver 14 would accept the packet as valid, thus thwarting the intent of various embodiments of the present invention, wherein the embedded receiver 14 accepts the packet and forwards or processes the embedded data and the TCP daemon discards the packet, thus triggering a resend of the packet containing the original, overt data and eliminating incomplete transmissions of packets having overt data which might otherwise give rise to suspicions that embedded communications are in progress.

In various aspects of the present invention, the aforementioned circumstances may be circumvented via use of the checksum collision handler 12c by, for example, comparing the first overt checksum module initially found in the TCP checksum field 38 of the packet 20 with the calculated first embedded checksum value. If the comparison proves equal, replacing the first embedded checksum value with a flag value (not shown). The flag value may comprise, for example, any predetermined value differing from the first embedded checksum value/first overt checksum value and recognizable by the embedded receiver 14 as a flag value.

Upon receipt of the packet 20 having a flag value in the TCP checksum field 38, the embedded receiver 14 recognizes the significance of the flag value, accepts the packet, and forwards or processes the embedded data. In contrast, the TCP daemon process 54 at the receiving end calculates a second overt checksum value for the packet, compares it to the flag value, and upon an unequal comparison, discards the packet 20, triggering a resend of the original packet having the overt data in the data field 46. A skilled artisan will note that certain algorithmic approaches used for initially calculating the first overt checksum value in typical TCP communications may result in a value equivalent to the predetermined flag value. Thus, after transmission to a receiving node, the packet 20 would still be accepted by the TCP daemon process 54 as valid, despite its payload of embedded data. If, for example, an end-around carry is used to calculate a 16-bit checksum value, the probability of this duplicative outcome may be bounded by approximately $2^{-16}$. Under such circumstances, various methods and modules may be selected, at the user's option, to identify, accommodate, or modify the flag value when equivalence in value occurs between the first overt checksum value and the flag value.

Figure 5:
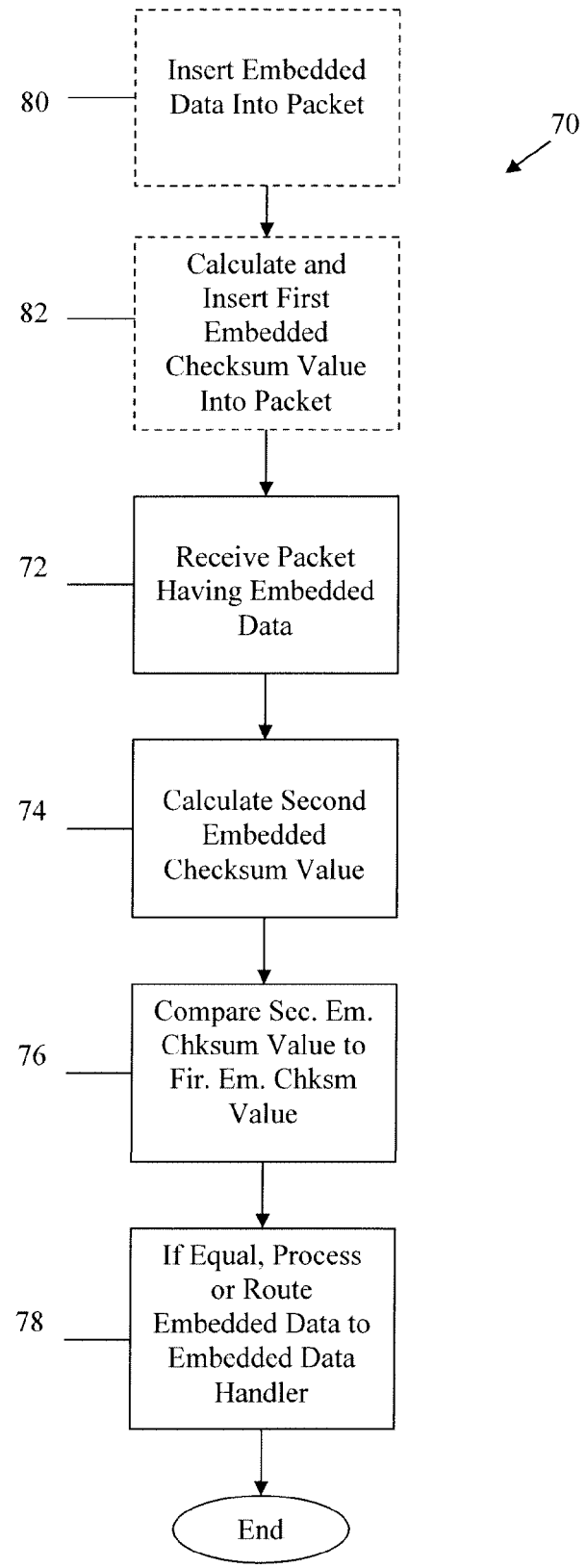
FIG. 5 illustrates a flow control diagram for a method of embedded communications, according to an embodiment of the present invention.

Turning now to FIG. 5 there is shown generally at 70 a method of embedded communications via a communication network which may include the steps, inter alia, of receiving a packet having embedded data in at least one field and a first embedded checksum value, shown at 72; calculating a second embedded checksum value for the embedded data, shown at 74; performing a checksum comparison between the first embedded checksum value and the second embedded checksum value, shown at 76; and if the checksum comparison is equal, then processing the embedded data or forwarding the embedded data to a predetermined embedded data handler, shown at 78. For example, a conventional TCP receiver and an embedded receiver associated with a communication network may receive a packet having embedded data. The conventional TCP receiver typically expects a packet with overt data, and upon calculation and comparison of a second overt checksum with the first embedded checksum value resulting in an inequality, discards the packet, thus resulting in an eventual retransmission of a copy of the packet having the original overt data.

The embedded receiver also performs a checksum comparison, although between the first embedded checksum value and a calculated second embedded checksum value. If the comparison is equal, then the embedded receiver processes the embedded data and/or forwards the data to, for example, an embedded data handler for processing.

Various aspects of the present invention may include one or more of the following steps, shown in phantom in FIG. 5, such as inserting embedded data into the packet, as shown at 80, and calculating the first embedded checksum value and inserting the calculated first embedded checksum value into the packet, as shown at 82. For example, the steps may be performed initially by the embedded transmitter and prior to, for example, transmission of the packet by a transmitter or other means via the communication network to the receiver and embedded receiver. In various aspects of the present invention, the step of inserting embedded data in the packet 80 may also comprise replacing overt data in the packet with the embedded data, the embedded data string either identical in length to the overt data string or differing in length therefrom. Further, the step of calculating and inserting a first embedded checksum value into a packet 82 may further comprise replacing a first overt checksum value with the first embedded checksum value.

Figure 6:
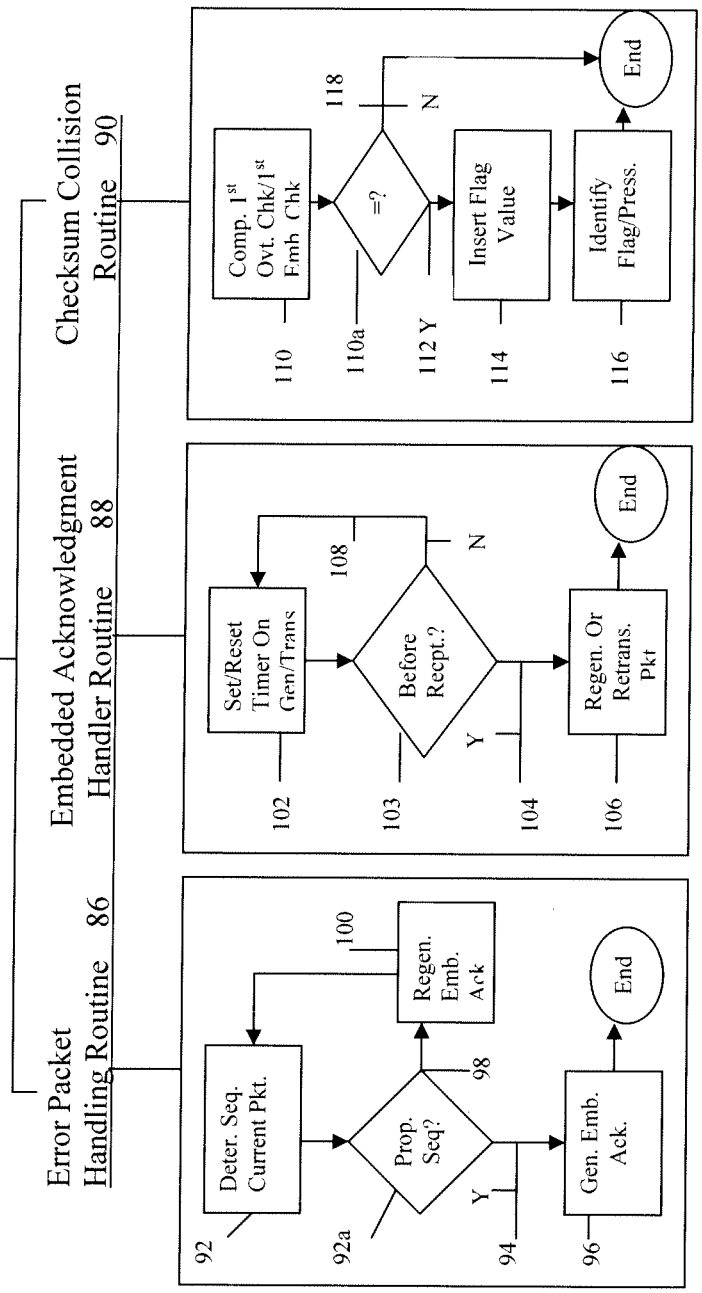
FIG. 6 illustrates a flowchart of selected error handling routines, according to an embodiment of the present invention.

Various aspects of the present invention further include the step of providing at least one error handling routine, as shown generally in FIG. 6 at 84. For example, the at least one error handling routine may include routines such as a packet error handler routine shown generally at 86; an embedded acknowledgment error handler routine, shown generally at 88; and a checksum collision routine, shown generally at 90.

The packet error handler routine 86 may include, for example, steps for determining if the current received packet having embedded data were received in proper sequence order, as shown at 92, 92*a*; if received in the properly sequenced order at 94, generating an embedded acknowledgment for the most recently received packet in proper sequence order, at 96; and if not received in the properly sequenced order at 98, then repeatedly regenerating the embedded acknowledgment for the last packet successfully received in proper sequence order until a predetermined event occurs at 100. For example, the embedded receiver associated with a communication network may compare a sequence number in a received number to an expected sequence number, and, upon discovering a mismatch between the actual and the expected sequence numbers, repeatedly regenerate the embedded acknowledgment for the last packet successfully received in proper sequence order, the regenerated embedded acknowledgment having a sequence number associated with the last packet successfully received in proper sequence order. An embedded transmitter associated with the communication network may receive the regenerated embedded acknowledgments, and upon successive receipt of three such embedded acknowledgments, the embedded transmitter may regenerate the next-in-sequence packet having embedded data, as determined with respect to the sequence number in the thrice-received embedded acknowledgments.

In cases where the embedded data arrives corrupt at destination, for example, when received by the embedded receiver, then the embedded receiver may, for example, discard the packet, then generate an embedded acknowledgment for the last successfully received packet in proper order sequence.

The embedded acknowledgment error handler routine 88 may include, for example, steps of setting or resetting a timer upon generation or transmission of a packet having embedded data at 102; and, determining if the time on the timer has expired at 103. If time on the timer expires before receipt of an embedded acknowledgment associated with the generated or transmitted packet having embedded data at 104, then regenerating or retransmitting said packet associated with the expected embedded acknowledgment at 106, else if the expected embedded acknowledgment is received before expiration at 108, then resetting the timer at 102.

The checksum collision routine 90 may include, for example, steps of comparing the first overt checksum to the first embedded checksum value at 110 to determine whether said checksums are equal at 110*a*. If the value comparison is equal at 112, then substituting a predetermined flag value for the first embedded checksum value 114; after receipt of the packet having a flag value, identifying the flag value and processing or forwarding packets having the predetermined flag value to an embedded data handler 116. If the comparison is unequal at 118, then the process ends.

Figure 7:
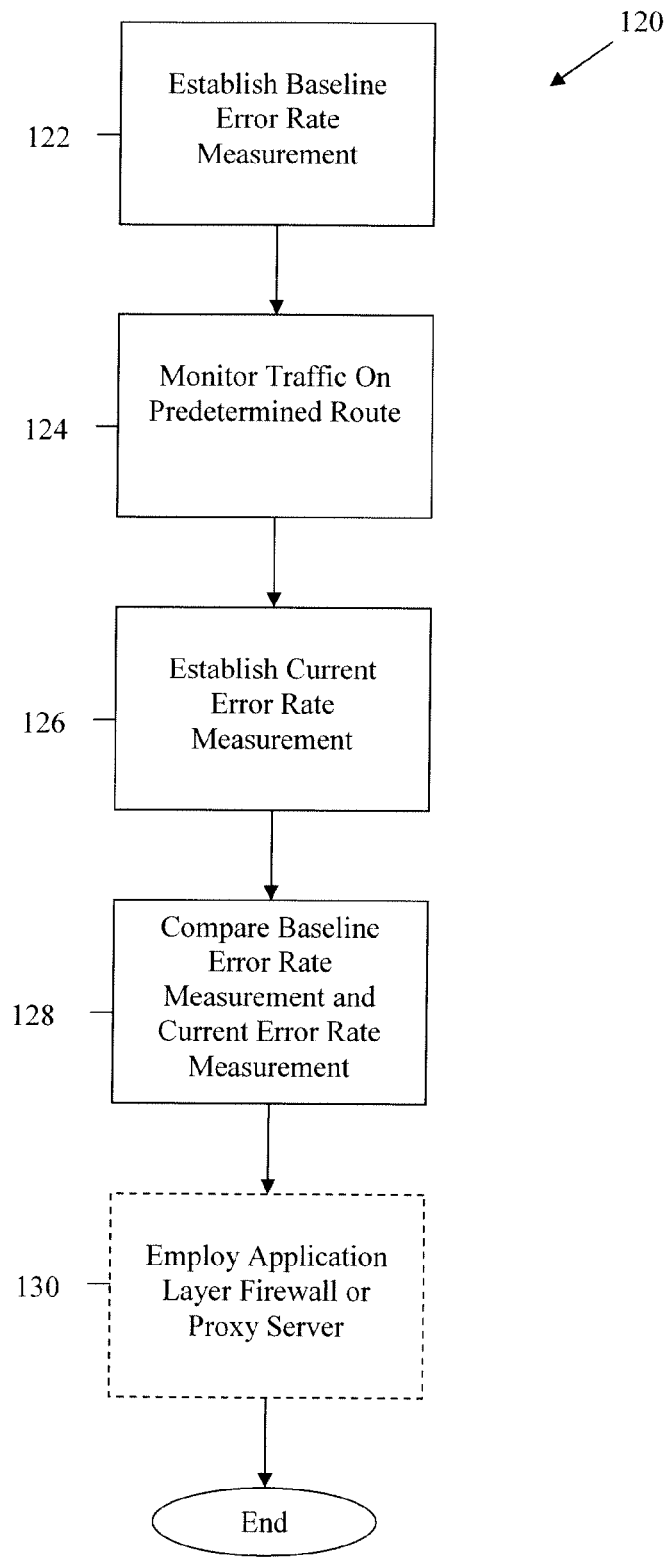
FIG. 7 illustrates a flowchart of a method of identification of an embedded communication process, according to an embodiment of the present invention.

Various other aspects of the present invention include methods for identifying and blocking embedded communications in a communication network via steganalytic techniques and tools. With reference now to FIG. 7, there is shown generally at 120 such a method, which may include steps of establishing a baseline error rate measurement in a predetermined route in the communication network, shown as 122; monitoring traffic on the predetermined route in the communication network to detect transmission errors, shown at 124; establishing a current error rate measurement based on the detected errors, shown at 126; and comparing the current error rate measurement with the baseline error rate measurement to determine a likelihood of embedded communication, shown at 128. For example, in certain environments, heavy use of steganographic communications may produce a number of packets having bad checksums, due to the inherent nature of the scheme in transmuting an overt checksum to an embedded checksum. Thus, if a route or channel between an origin and destination node for communications is monitored during normal communication of TCP packets and a baseline error rate for packet failure (including packets having bad checksums) is established, then comparison to an established current error rate for a suspected covert channel may reveal a spike or increase in packet error rates. The increased current error rate may indicate the presence of embedded communications utilizing packet infrastructures for operation. One advantage to use of an error rate in an established route is that basic, non-packet related causes of errors, such as specific noisy data transmission links or faulty TCP daemons, are already calculated into the baseline error rate (accounted for), thus any significant deviation from the baseline error rate is likely attributable to a packet error-based cause.

In various aspects of the present invention, the step of monitoring traffic and establishing a current error rate measurement may include use of a network monitoring log application. For example, the network kernel in many operating systems may already offer this functionality in applications such as netstat, wherein use of the command "netstat -s -p tcp" from a Windows® NT DOS shell provides statistical output related to communication transmissions originating from or destined to a local host.

Other aspects of the present invention may include a step of employing means such as application level firewalls or proxy servers between the transmitter and the receiver to thwart embedded communications, as shown at 130. For example, a transmitter may transmit overt data in a packet to a transport layer, which inserts embedded data in place of the overt data and inserts an embedded checksum by means of an embedded transmission scheme. The packet having embedded data transits the remaining layers of the network model without detection or modification and is transmitted on a network. Any intermediate nodes on the network, operating at the network layer, will simply forward the packet with its embedded data intact, since the changes in the checksum are detected only at the transport layer. An application layer firewall along the path from the embedded transmitter to receiver will try to reassemble the packets into useful data prior to forwarding to destination. In this way, the transport layer of the application layer firewall will detect, and discard, the segments having the "bad" (mismatched) checksums, effectively destroying the embedded data. In cases where the application layer firewall is also the embedded receiver, the embedded data may arrive at its destination intact. A skilled artisan will note that other methods and means may be employed to identify or block embedded communications.

It is understood that other embodiments may be utilized, and structural and operational changes may be made without departing from the scope of the present invention.

What is claimed is:

1. A method for identifying embedded communications in a communication network, the method comprising:
    establishing a baseline checksum failure rate measurement for packets communicated in accordance with a specified communication protocol in a predetermined route in a transport layer of the communication network;
    monitoring traffic on the predetermined route in the transport layer of the communication network to detect checksum failures of the packets;
    establishing a current checksum failure rate measurement based on the detected checksum failures;
    comparing the current checksum failure rate measurement with the baseline checksum failure rate measurement;
    when the current checksum failure rate measurement is greater than the baseline checksum failure rate measurement, determining an embedded communication of covert data is being communicated in the specified communication protocol; and
    blocking the embedded communication in the transport layer of the communication network by discarding packets having a detected checksum failure.

2. The method of claim 1, wherein the monitoring traffic and establishing a current checksum failure rate measurement includes use of a network monitoring log application.

3. The method of claim 1,
    wherein said method is implemented in an application level firewall or a proxy server between a transmitter and a receiver in the communication network to thwart embedded communications of covert data.

4. The method of claim 1, further comprising:
    communicating the determination of the embedded communication.

* * * * *